United States Patent
Roberts et al.

(10) Patent No.: US 10,885,478 B2
(45) Date of Patent: Jan. 5, 2021

(54) COMPUTER-IMPLEMENTED SYSTEM AND METHOD FOR PROVIDING CONTEXTUALLY RELEVANT TASK RECOMMENDATIONS TO QUALIFIED USERS

(71) Applicant: Palo Alto Research Center Incorporated, Palo Alto, CA (US)

(72) Inventors: Michael Roberts, Los Gatos, CA (US); Simon Tucker, Oakland, CA (US); Shane Ahern, Foster City, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 228 days.

(21) Appl. No.: 15/203,727

(22) Filed: Jul. 6, 2016

(65) Prior Publication Data

US 2018/0012170 A1 Jan. 11, 2018

(51) Int. Cl.
*G06Q 10/06* (2012.01)
*G06F 16/2457* (2019.01)

(52) U.S. Cl.
CPC ........... *G06Q 10/063112* (2013.01); *G06F 16/24578* (2019.01)

(58) Field of Classification Search
CPC ............................................. G06Q 10/063112
See application file for complete search history.

(56) References Cited

U.S. PATENT DOCUMENTS

| | | | |
|---|---|---|---|
| 7,743,050 B1 | 6/2010 | Bem et al. | |
| 7,885,844 B1 * | 2/2011 | Cohen | G06Q 10/10 |
| 8,554,703 B1 | 10/2013 | Lin et al. | |
| 8,868,472 B1 | 10/2014 | Lin et al. | |
| 9,256,785 B2 * | 2/2016 | Qvarfordt | G06K 9/00617 |
| 9,280,911 B2 * | 3/2016 | Sadeh-Koniecpol | H04L 63/1483 |
| 9,374,434 B2 * | 6/2016 | Sylvain | H04M 3/42374 |
| 9,589,560 B1 | 3/2017 | Vitaladevuni et al. | |
| 9,906,539 B2 * | 2/2018 | Higbee | H04L 63/1433 |
| 10,330,440 B2 * | 6/2019 | Lyren | G02B 27/0189 |
| 2003/0065731 A1 | 4/2003 | Mohammed et al. | |

(Continued)

FOREIGN PATENT DOCUMENTS

EP 1850134 A1 * 10/2007 ............. G01N 33/86

OTHER PUBLICATIONS

Vo, C. C., Torabi, T., & Loke, S. W. (2009). Towards context-aware task recommendation. 2009 Joint Conferences on Pervasive Computing (JCPC). doi:10.1109/jcpc.2009.5420173 (Year: 2009).*

(Continued)

*Primary Examiner* — Matthew S Gart
*Assistant Examiner* — Tiera J Fletcher
(74) *Attorney, Agent, or Firm* — Krista A. Wittman

(57) ABSTRACT

A computer-implemented system and method for providing contextually relevant task recommendations to qualified users is provided. Sensor data is collected for a user. The user's location is determined and subsequently, an activity of the user is determined based on the sensor data and the location. Two or more recommendable items are scored based on the activity and one or more of the recommendable items with the highest scores are selected. Finally, one or more recipients qualified to perform each of the recommendable items are identified.

20 Claims, 5 Drawing Sheets

(56) References Cited

U.S. PATENT DOCUMENTS

| | | |
|---|---|---|
| 2006/0109237 A1 | 5/2006 | Morita et al. |
| 2007/0260596 A1 | 11/2007 | Koran et al. |
| 2008/0294617 A1 | 11/2008 | Chakrabarti et al. |
| 2009/0077057 A1 | 3/2009 | Ducheneaut et al. |
| 2010/0241464 A1 | 9/2010 | Amigo et al. |
| 2011/0125678 A1* | 5/2011 | Partridge ............... G06Q 30/02 706/12 |
| 2011/0302169 A1 | 12/2011 | Brdiczka et al. |
| 2012/0041969 A1 | 2/2012 | Priyadarshan et al. |
| 2012/0257733 A1 | 10/2012 | Kosseifi et al. |
| 2012/0310587 A1 | 12/2012 | Tu et al. |
| 2013/0009993 A1 | 1/2013 | Horseman |
| 2013/0262216 A1 | 10/2013 | Zhang et al. |
| 2013/0271454 A1 | 10/2013 | Lyons et al. |
| 2013/0325970 A1 | 12/2013 | Roberts et al. |
| 2014/0257540 A1 | 9/2014 | Pacione et al. |
| 2014/0280208 A1 | 9/2014 | McConky et al. |
| 2014/0282257 A1 | 9/2014 | Nixon et al. |
| 2015/0193695 A1 | 7/2015 | Cruz Mota et al. |
| 2015/0324686 A1 | 11/2015 | Julian et al. |
| 2016/0093154 A1 | 3/2016 | Bytnar et al. |
| 2016/0119364 A1 | 4/2016 | Zolli |
| 2016/0140481 A1 | 5/2016 | Huang et al. |
| 2016/0142435 A1 | 5/2016 | Bernstein et al. |
| 2016/0283887 A1 | 9/2016 | Jagyasi et al. |
| 2016/0314627 A1 | 10/2016 | Fish et al. |
| 2016/0321616 A1 | 11/2016 | Gedge et al. |
| 2016/0358065 A1 | 12/2016 | Gedge et al. |
| 2016/0359993 A1 | 12/2016 | Hendrickson et al. |
| 2016/0379136 A1 | 12/2016 | Chen et al. |
| 2017/0032248 A1 | 2/2017 | Dotan-Cohen et al. |
| 2017/0126963 A1 | 5/2017 | Todasco |
| 2017/0140285 A1 | 5/2017 | Dotan-Cohen et al. |
| 2017/0177833 A1 | 6/2017 | Lewallen et al. |
| 2017/0178024 A1 | 6/2017 | Kida |
| 2017/0187807 A1 | 6/2017 | Clernon |
| 2017/0279827 A1 | 9/2017 | Savalle et al. |
| 2017/0289769 A1 | 10/2017 | Ceker et al. |
| 2017/0309196 A1 | 10/2017 | Vangala et al. |

OTHER PUBLICATIONS

Rello et al., "Detecting Readers with Dyslexia Using Machine Learning with Eye Tracking Measures," May 18-20, 2015, W4A '15 Proceedings of the 12th Web for All Conference, pp. 1-8.

Eivazi et al., "Predicting Problem-Solving Behavior and Performance Levels from Visual Attention Data," Feb. 13, 2012, 2nd Workshop on Eye Gaze in Intelligent Human Machine Interaction, pp. 9-16 (Year: 2012).

Ratwani et al., "A Real-Time Eye Tracking System for Predicting and Preventing Postcompletion Errors," Human-Computer Interaction, 2011, vol. 26, pp. 205-245 (Year: 2011).

\* cited by examiner

COMPUTER-IMPLEMENTED SYSTEM AND METHOD FOR PROVIDING CONTEXTUALLY RELEVANT TASK RECOMMENDATIONS TO QUALIFIED USERS

FIELD

This application relates in general to determining context, and in particular to a computer-implemented system and method for providing contextually relevant task recommendations to users engaged in tasks.

BACKGROUND

As younger generations join the workforce, companies are searching for effective ways to train and interact with these new employees. Currently, health and safety is taught and regulated using a combination of printed training material, posted signs, and supervision. However, younger individuals are used to receiving information and notices on their mobile computing devices, including smart phones and tablets. Based on the different experiences and expectations of the younger workforce, existing methods for training and communication are not as effective as in the past.

Currently, some companies are allowing online access to their information, including policies, employee handbooks, employee email, work product, and other documents, such as through a virtual private network. However, despite the ability to access such information, employees may have questions regarding the information or are unable to properly perform particular tasks listed in the available materials, which can result in accidents or lack of productivity, as well as a possible violation of compliance guidelines. Further, the information may not be immediately available when needed by the user. For instance, if the user is working in a laboratory and a fire starts, the user is likely unable to login to the virtual private network to access information for putting out the fire and proper protocol. Additionally, even if information about preventing and putting out fires is on a wall in the laboratory, the user may be unable to access the information or may be unqualified to perform the necessary procedures to put out the fire or conduct a proper clean up once the fire is out.

Therefore, there is a need for an approach to providing relevant information to an appropriate individual during a time at which the information is necessary and relevant. Preferably, a current scenario is identified for a user and one or more tasks to be performed are sent to a mobile computing device associated with the user based on the scenario. If the user is unable to perform one or more of the recommended tasks, a further individual can be notified to complete the recommended step.

SUMMARY

To ensure that employees of a company are provided with information relevant to a current situation, contextual information of each employee is first collected and used to determine a projected activity of the employee. Subsequently, based on the determined activity, one or more tasks can be recommended to the employee via a mobile computing device associated with the employee. If the employee is not qualified to perform one or more of the recommended tasks, one or more other employees are identified and notified of the recommended task to be performed. Such employees can provide just-in-time training to the original employee, or perform the task themselves.

A computer-implemented system and method for providing contextually relevant task recommendations to qualified users is provided. Sensor data is collected for a user. The user's location is determined and subsequently, an activity of the user is determined based on the sensor data and the location. Two or more recommendable items are scored based on the activity, and one or more of the recommendable items with the highest scores are selected. Finally, one or more recipients qualified to perform each of the recommendable items are identified.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Currently, most companies train new employees using printed material, posted signs, and supervision. However, the younger workforce is accustomed to receiving, maintaining, and accessing information on their mobile computing devices, such as smart phones and tablets, which can make using the printed materials and signs difficult. Further, printed materials are often misplaced or thrown away, which makes accessing such documents, difficult. Accordingly, to ensure that all employees can readily access relevant information when needed or that assistance is provided in a timely fashion, the activities of each employee can be monitored. Subsequently, task recommendations can be provided to the employee based on the current activity being performed. Also, if the employee is not qualified to perform one of the recommended tasks, another employee can be contacted.

Figure 1:
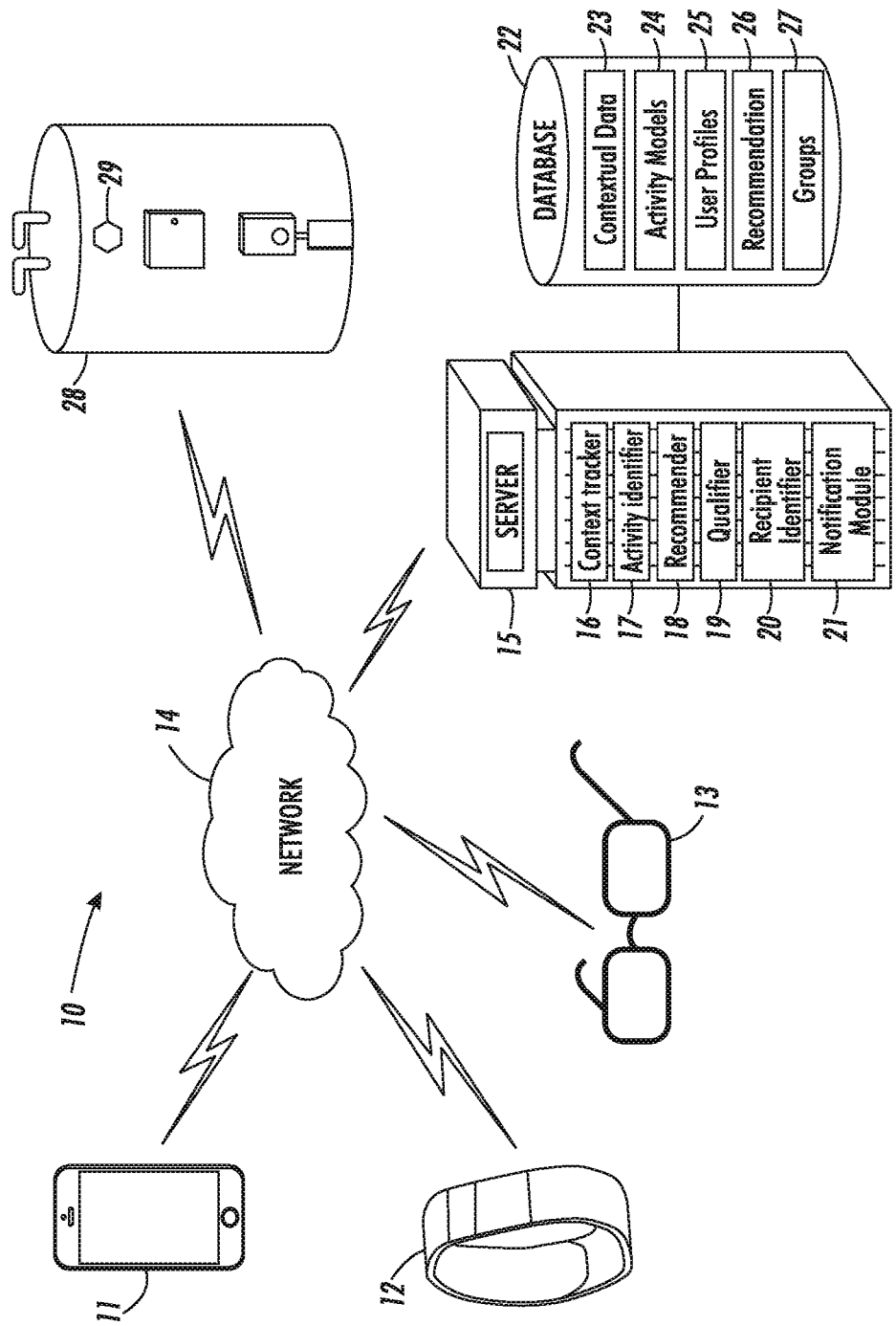
FIG. 1 is a block diagram showing a computer-implemented system for providing contextually relevant task recommendations to qualified users, in accordance with one embodiment.

Providing relevant information to an appropriate user in a timely manner can increase employee productivity, reaffirm and evaluate training, ensure guideline compliance, and prevent accidents. FIG. 1 is a block diagram showing a computer-implemented system 10 for providing contextually relevant task recommendations to qualified users, in accordance with one embodiment. An employee (not shown) of a company or other individual can access an application for providing relevant tasks to qualified employees based on an identified activity. The employee can be associated with one or more computing devices, including a smartphone 11, a smart watch 12, and a head-mounted computing device 13, such as Google Glass manufactured by Google Inc. Hereinafter, the terms "employee" and "user" are used interchangeably with the same intended meaning, unless otherwise indicated.

Each of the computing devices 11-13 can collect contextual data 23 of the employee, including one or more of location, acceleration, movement tracking, inventory, use of machinery, chemicals, and other types of data related to the user's current surroundings. The contextual data 23 can be collected via sensors within the computing devices 11-13 or via sound or video recording via the computing devices. Further, Bluetooth beacons 29 can be affixed to one or more pieces of equipment 28 located within a workspace (not shown) owned by the employee's company or at various locations within the workspace itself. Each of the mobile computing devices 11-13 can also include Bluetooth to enable communication with the Bluetooth beacons 29 and identify a location of a user with respect to one or more of the Bluetooth beacons.

Once collected, the contextual data 23 can be separately transmitted from each computing device 11-13 to a server 15 via an internetwork 14, such as the Internet. The server 15 includes a context tracker 16, an activity identifier 17, a recommender 18, a qualifier 19, a recipient identifier 20, and a notification module 21. Further, the server is interconnected to a database 22, which can be used to store the contextual data 23, activity models 24, user profiles 25, recommendations 26, and groups 27.

The contextual data 23 from each of the computing devices 11-13 is received by the contextual tracker 16 for analysis and storage in the database 22. Specifically, the contextual tracker 16 can identify one or more low level activities being performed by the employee based only on the contextual data. In a further embodiment, the low level activities can be identified by the specific computing device that collected the contextual data. Subsequently, the activity identifier 17 identifies high level activities of the employee using activity models 24 based on one or more of the low level activities. Identifying activities is further described in detail with reference to FIG. 3. Once identified, the activities of the user can be stored in the database 22 in an activity log (not shown).

Based on the identified activity, helpful advice or tasks to be performed can be provided to the employee, regardless of whether a need for assistance by the employee is identified. The helpful advice can include messages, information, instructions, schematics, or plans, while the tasks can include service procedures, requests for action, and agent-actions to make on behalf of the employee. The recommender 18 can provide the helpful advice and tasks as recommendations 26 for display on at least one of the computing devices 11-13 associated with the employee. Identifying appropriate recommendations can be based on the identified activity, as described in further detail in commonly-owned U.S. Patent Application Publication, Serial No. 2018/0012229, published on Jan. 11, 2018, pending, the disclosure of which is incorporated by reference. Additionally, once the activity is identified, a predicted outcome of the activity can also be determined, as described in detail in commonly-owned U.S. Patent Application Publication, Serial No. 2018/0012126, published on Jan. 11, 2018, pending, the disclosure of which is incorporated by reference. Subsequently, based on the outcome prediction, further assistance or recommendations can be provided to the employee.

Prior to or subsequent to providing the recommendations 26 to the employee, the qualifier 19 can compare each recommendation with a profile 25 of the employee to determine whether the employee is qualified to perform that recommendation. The user profile 25 can include a name of the employee, birthdate, sex, age, address, phone number, date of employment, and experience, such as work history, training courses completed, skills, access permission to specified areas, current activity, and predicted future activity. Other types of profile information are possible. If the employee is qualified, the recommendations can be transmitted to the employee only. However, if the employee is not qualified to perform one or more of the recommended tasks, the recipient identifier 20 identifies one or more other employees for providing the recommended tasks. In one embodiment, the employees can each be associated with one or more groups 27 based on their skills and experience as provided by their user profile. Each group is then associated with one or more topics or key words describing the skills and abilities of the member employees in that group. The recommended tasks can then be recommended to one or more of the groups based on the designated skills and abilities of the group members.

The mobile computing devices 11-13 and server 15 can each include one or more modules for carrying out the embodiments disclosed herein. The modules can be implemented as a computer program or procedure written as source code in a conventional programming language and is presented for execution by the central processing unit as object or byte code. Alternatively, the modules could also be implemented in hardware, either as integrated circuitry or burned into read-only memory components, and each of the client and server can act as a specialized computer. For instance, when the modules are implemented as hardware, that particular hardware is specialized to perform the data quality assessment and other computers cannot be used. Additionally, when the modules are burned into read-only memory components, the computer storing the read-only memory becomes specialized to perform the data quality assessment that other computers cannot. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

Figure 2:
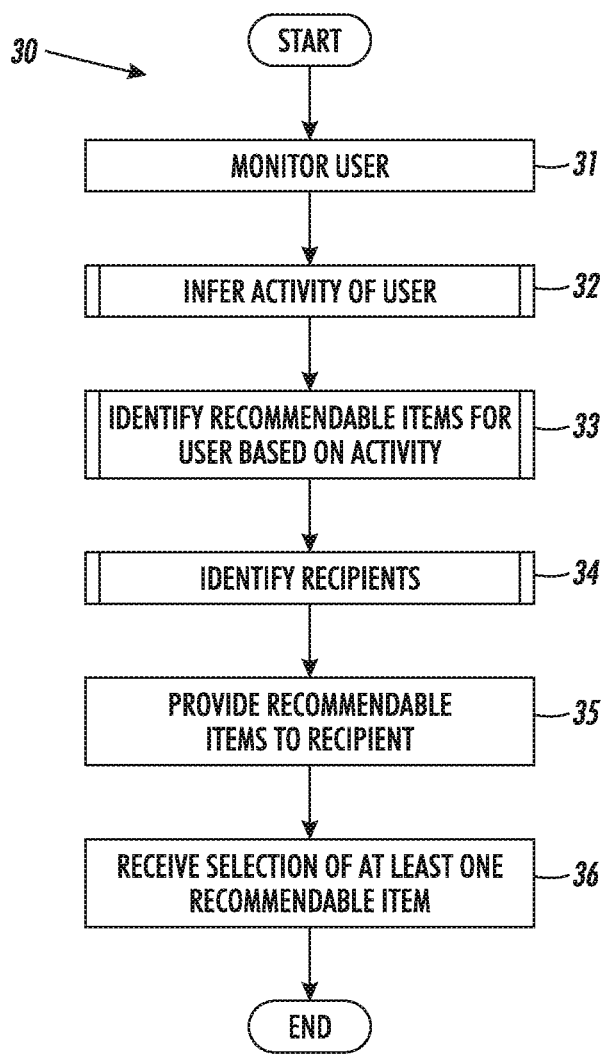
FIG. 2 is a flow diagram showing a computer-implemented method for providing contextually relevant task recommendations to qualified users, in accordance with one embodiment.

Monitoring and tracking employees can increase the productivity of a company as well as ensure that work is being performed according to company guidelines, rules, and regulations by identifying a contextual situation of an employee and providing tasks to be performed based on the employee's situation. FIG. 2 is a flow diagram showing a computer-implemented method 30 for providing contextually relevant task recommendations to qualified users, in accordance with one embodiment. Prior to or during a work shift, an employee is associated with one or more sensors via at least one mobile computing device. For instance, a researcher working in a laboratory of a drug company can carry a smart phone in his pocket, as well as wear a mobile computing headset or a smart watch.

During the employee's shift, movement and actions of the employee are monitored (block 31). Contextual data, including location, acceleration, movement tracking, inventory, and other types of data related to the user's current surroundings, are collected by the sensors during the monitoring. The contextual data is then used to help identify (block 32) an activity associated with the employee, such as an action being performed or experienced by the employee or an activity describing an existing situation surrounding the employee. Identifying an activity is further described below in detail with reference to FIG. 3.

Returning to the above laboratory example, contextual data collected for the researcher includes a location of the employee, which is obtained via GPS on the smart phone, a location of the employee with respect to a particular piece of equipment, as identified via Bluetooth, and a video of the employee obtained via a camera, such as on the mobile headset. Based on the collected contextual data, the researcher is determined to be performing the activity of protein purification.

Once an activity is determined, one or more recommendations can be identified (block 33) for transmitting to the employee via one or more of the associated computing devices. The recommendations can be identified using numeric calculations to combine elements from the employee's profile with data from each of the recommendations stored in a database. Selecting one or more recommendations for providing to the employee is further discussed below in detail with reference to FIG. 4. Once the appropriate recommendations are identified, recipients are identified (block 34) for sending the identified recommendations. In one embodiment, recipients of the recommendations can be identified based on the each of the recipients' ability to complete the recommended tasks, as further described below in detail with reference to FIG. 5. Upon identifying the recipients, the recommended tasks are provided (block 35) to each recipient via mobile computing devices associated with that recipient. Finally, one or more tasks can be selected (block 36) for performance by at least one of the recipients. When multiple recipients are identified, the task selection can be displayed to the other recipients to prevent duplicate task selection. Alternatively, a determination can be made that one of the recipients is performing one of the recommended tasks based on contextual data collected for that recipient and a notification can be sent to the other recipients. In one embodiment, each task can be stored with a set of instructions. Upon assignment of a task to a recipient, the associated instructions can be displayed on a wireless computing device of that recipient to assist in performing the task.

Returning to the above laboratory example, the researcher is determined to be performing protein purification. Based on the purification activity, selected recommendations provided to the employee can include running the proteins through a further purification process, using for example, high-performance liquid chromatography; performing an SDS-PAGE gel to visualize the isolated protein; and cutting extra tags off of the isolated protein after nickel purification using an enzyme. Upon review of the researcher's profile, a determination is made that the researcher is qualified to perform each of the recommended tasks and thus, is provided with all three recommendations.

Figure 3:
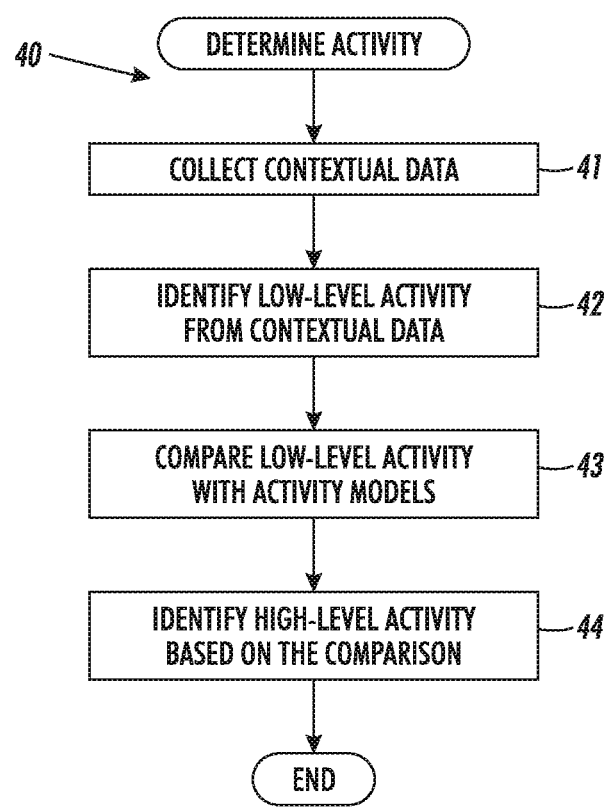
FIG. 3 is a flow diagram showing, by way of example, a process for determining an activity associated with a user.

Determining and tracking activities associated with an employee helps anticipate a need of the user in real-time and provide immediate assistance and resolution. Identifying such activities can be performed based on sensor data collected from the employee's surroundings. FIG. 3 is a flow diagram showing, by way of example, a process 40 for determining an activity associated with an employee. Contextual data is collected (block 41) from sensors encompassed by mobile computing devices associated with the employee. The mobile devices can include one or more of a smart phone, smart watch, and head-mounted computing device, as well as other types of mobile computing devices. Each of the mobile devices can include multiple sensors to measure contextual data, including speed, location, acceleration, physical movement, eye gaze, object presence, inventory, scenery, and traffic, as well as other types of data. Further, video and sound data can be recorded, and a location of the employee with respect to a particular room or piece of equipment within a work facility can be identified using Bluetooth.

One or more low-level activities being performed by the employee can be identified (block 42) directly from the contextual data. Each low-level activity describes a raw action being performed by the employee. For instance, if an accelerometer provides a reading of zero, then the employee is determined to be still and not accelerating or moving to a different location. However, a different sensor may identify movement of the employee by the pressing of a button on one of the mobile devices. The low-level activities are then compared (block 43) with a set of activity models to determine (block 44) a high-level activity expressed by the model. A high-level activity describes a specific action being performed by the employee based on the raw actions detected. For instance, returning to the example above, the employee is determined to be still, but moving with respect to the mobile device button selection, which may indicate some sort of work being conducted on the mobile device. Combined with data for tracking computer use, the employee activity is determined to be pressing send on an email.

In one embodiment, each high-level activity can be stored as a model that includes one or more raw actions to identify that specific high-level activity. Those models that most closely resemble the detected raw actions of the employee are identified and selected as the high-level activity identified as being performed by the employee. Each activity model can be focused on the specific employee based on actions performed by that employee over time, as well as on background information regarding the employee's job title and skill set. Alternatively, the activity models can be based on a population of employees with the same or similar job titles and skills as the employee. In one embodiment, the low-level activities can each be detected by the mobile devices associated with the employee, while the high-level activities can be determined by a remote server using the activity models.

Returning to the above laboratory example, contextual data collected for the employee identifies low level activities, such as a presence of the employee in Lab Room E203, as identified via GPS, standing in front of a fume hood, as identified via Bluetooth, and holding a bottle of mercaptoethanol, as identified via a camera, such as on the mobile headset. Based on the low level activities, the employee is determined to be performing the high level activity of preparing a lysing buffer, for use in protein purification, to keep the isolated protein stable by preventing formation of disulfide bonds and protein precipitation. Mercaptoethanol can also be used for RNA isolation. However, referencing the employee's profile, in addition to analysis of the contextual data, helps identify that the employee is performing protein extraction as opposed to RNA isolation since the profile indicates that the employee is a research scientist and currently studying protein-protein interactions to determine specific contact between two or more proteins based on particular biochemical events.

In one embodiment, the employee's profile can include hierarchical categorizations of skills and experience. For instance, for profession, the hierarchical categorization can include health industry, which covers medical providers, researchers, insurers, and pharmaceuticals. Further, researchers cover laboratory researchers and computational researchers, while laboratory researchers covers chemistry, biochemistry, and biology. Research of protein-protein interactions falls under biochemistry. The hierarchical categories associated with an employee can be used to identify activities, as described above, or to determine the employee's ability to perform recommended tasks, as described below with reference to FIG. 5.

Once identified, the activity can be used to track an employee's progress with respect to a particular procedure being performed. Specifically, a list of guidelines or steps for performing activities is stored in a database. For instance, returning to the above laboratory example, the guidelines for protein purification can be accessed from a database and the employee can be monitored to ensure that each of the predetermined steps are correctly performed. The guidelines for protein purification include: 1) prepare lysing buffer with mercaptoethanol; 2) suspend cells containing protein of interest in prepared buffer; 3) lyse cells; and 4) perform Nickel purification. Based on the contextual data and identified activity, the employee appears to be performing the first step of preparing a buffer for protein purification. Thus, the next activity to be performed by the employee should be suspending the cells in the buffer and recommendations for performing the activity can be provided, as described in detail below.

In a further embodiment, distributed activity detection can be used to identify activities performed by the user. Distributed activity detection helps offset some of the processing typically required by a server and can result in faster and more accurate identification of an activity using high frequency data. First, contextual data is collected for a user via one or more mobile computing devices. Features are extracted from the data to generate a feature vector. The feature vector is then compared with one or more activity models stored on at least one of the mobile computing devices and a similarity measure is determined for each model. If one of the models satisfies a predefined amount of similarity to the feature vector, an identification label for the activity associated with that model is assigned to the feature vector. However, if none of the models satisfy the similarity, the user is requested to assign an activity label to the activity represented by the feature vector and the activity label is transmitted to a server with the feature vector for training a new model. Once trained, the server transmits the new model to the mobile computing device for running. Distributed activity detection is described in further detail in commonly-owned U.S. patent application Ser. No. 15/203,764, entitled "Computer-Implemented System and Method for Distributed Activity Detection,", filed on Jul. 6, 2016, pending, the disclosure of which is incorporated by reference.

Figure 4:
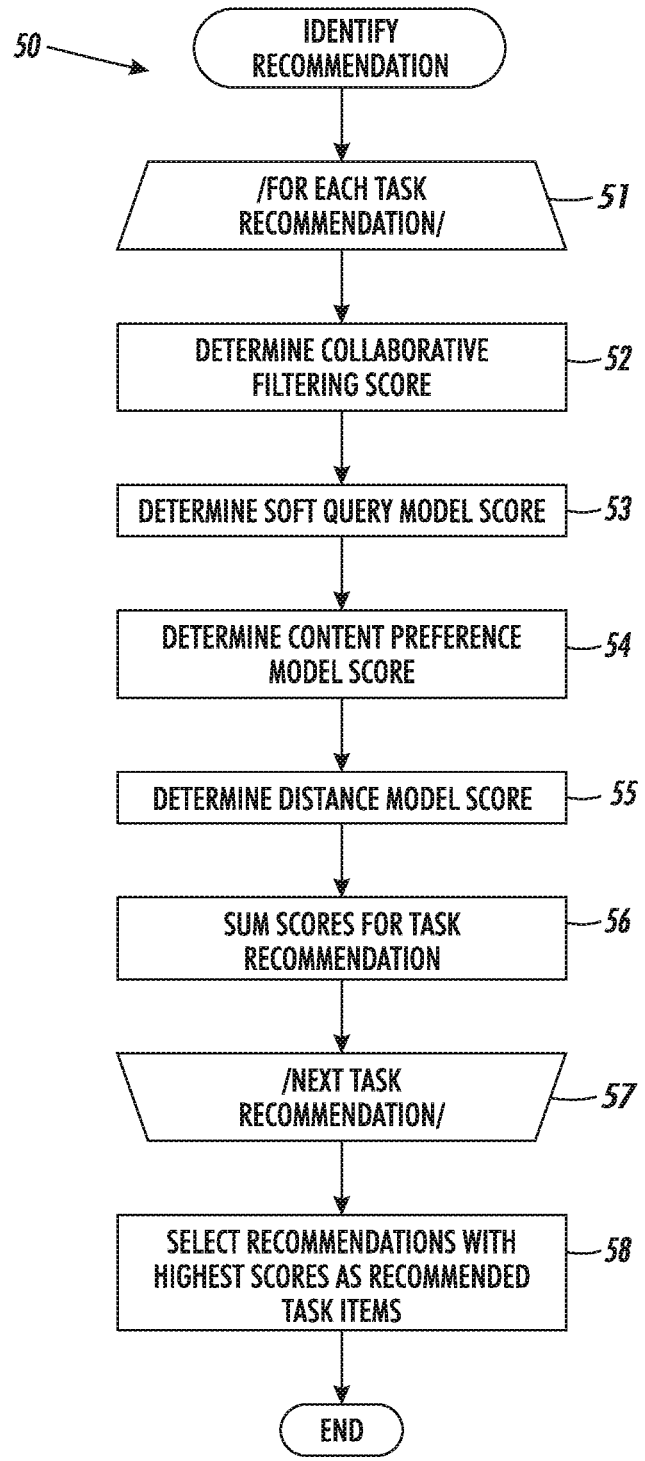
FIG. 4 is a flow diagram showing, by way of example, a process for identifying recommendations.

Once an activity performed by the service provider is identified, one or more recommendations can be identified for providing to qualified users to assist with the activity. The recommendations can be identified by looking at all possible tasks that can be performed to make completing the activity easier, faster, or in compliance with a set of guidelines. In one embodiment, the recommendations can be identified using a mixed-model recommender, as described in commonly-owned U.S. Patent Application Publication No. 2009/0077057, pending, the disclosure of which is incorporated by reference. FIG. 4 is a flow diagram showing, by way of example, a process 50 for identifying recommendations for providing to one or more recipients using a mixed-model recommender. A database of tasks is accessed and each task is processed (block 51) as a candidate task for recommendation.

The tasks can be created and identified using, for example, a web application based simulator. A user can establish a contextual situation represented by a set of activity signals, by selecting actions for input into the simulator to define the situation, such as a chemical spill. The actions can be input via drop down boxes or by dragging and dropping each action. For instance, for a chemical spill, the actions can include presence in a room with chemicals and the sound of breaking glass. Subsequently, the user can select one or more tasks for performance when the particular situation or activity is identified by selecting one or more actions from a list. Each task can be represented via a vector of relevant factors and annotated with metadata, such as links to training materials, instructions, and helpful hints, as well as other types of metadata. An exemplary task vector might contain numeric representations of various properties of the task, for example, requires experience with chemical splits (1.0), requires use of fume hood (1.0), involves chemical mercaptoethanol (1.0), with all other task vector values being 0. The task vector can include a potentially large number of possible values, most of which will be 0 for any given task, but which together represent the whole of the task space in which the user is working. An exemplary activity description vector will contain a number of values in the same sense, but the labels for the slots in the vectors do not need to be the same, and the slots can represent low-level activities. Machine learning, such as SVM, can be used to relate lower-level contextual situations represented by the activity vector to a set of tasks which could be performed given the contextual situation and an available training set of activity-task training pairs, generated using the web-based simulator.

Given the set of likely task recommendations, one or more task recommendations can be produced. Recommendable tasks are scored as candidates to determine which recommendations are most relevant to the identified activity. In one embodiment, the candidate recommendations to be scored can be identified via the simulator upon determination of the employee's activity. The recommendation scoring can occur via four scoring models, including collaborative filter scoring, soft query model scoring, content preference model scoring, and distance model scoring are used to generate a list of recommendations. Scoring by the individual models can occur in the order shown in FIG. 4, in a different order, or simultaneously. The recommendations can include pushing textual or other information to the user, contacting another user for help in performing a task, or a suggestion for a supplemental task, as well as other types of recommendations.

For each candidate task recommendation, a collaborative filtering score can be determined (block 52) by matching the employee to a large pool of users based on information such as age, gender, income level, education, location, and occupation, as well as other personal factors. Subsequently, recommendations for the employee can be identified based on preference information of the other users in the pool. The soft query model score is determined (block 53) for the candidate task by considering the employee's own preferences, which can be stored in the employee profile. Then, the soft query model score is assigned based on that employee's preferences. The context preference model score is determined (block 54) by boosting recommendations that are semantically related to the employee's interests, as determined, for example, by the employee's online search history. The distance model score is determined (block 55) by determining the employee's location using GPS coordinates and estimating the employee's range of motion in relation to a location or range of locations at which a task recommendation could be performed. Subsequently, the distance model score is assigned to each recommendation based on the employee's proximity to the place where that recommendation would be performed.

Once the collaborative filtering, soft query, content preference, and distance model scores have been computed for the candidate recommendation, the scores are summed (block 56) for a total recommendation score for each task recommendation. A total recommendation score is determined (block 57) for each candidate task recommendation until no more candidate task recommendations remain for scoring. Subsequently, the task recommendations with the highest scores are selected (block 58), as most relevant to the identified activity. The selected task recommendations are then provided to one or more recipients, such as the employee or other employees, as recommendable items, as discussed above with respect to FIG. 2. The selected task recommendations can include all tasks having a recommendation score above a predetermined threshold or a predetermined number of recommendations with the highest recommendation scores. Other methods for selecting the task recommendations are also possible, such as via a rule-based recommender.

Figure 5:
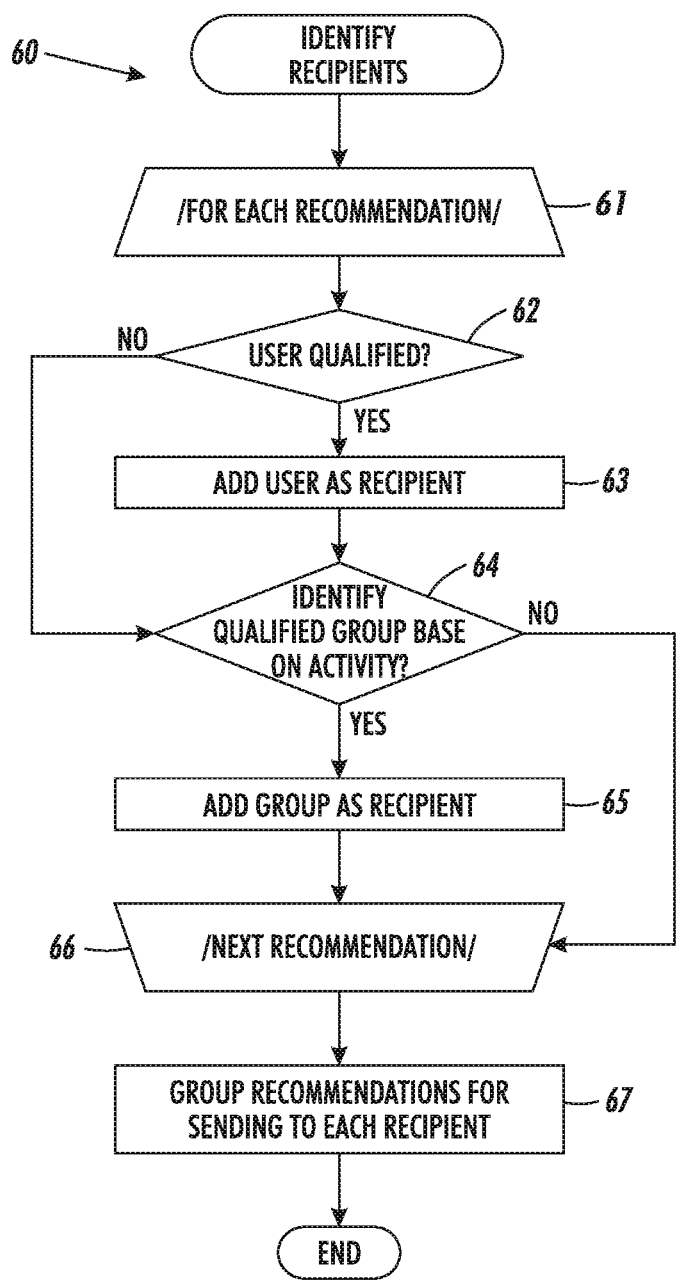
FIG. 5 is a flow diagram showing, by way of example, a process for identifying recipients of recommendations.

Upon identifying appropriate tasks for recommendation, qualified recipients must also be identified for providing with one or more of the recommended tasks. FIG. 5 is a flow diagram showing, by way of example, a process 60 for identifying recipients. For each recommended task (block 61), a determination is made as to whether the employee is qualified (block 62) to perform such task. Qualification of the employee can be determined based on a comparison of the selected task with the employee's profile. For example, returning to the above laboratory example, the recommendations include running the proteins through a further purification process using high-performance liquid chromatography, performing an SDS-PAGE gel to visualize the isolated protein, and cutting extra tags off of the isolated protein after nickel purification using an enzyme were identified. Based on the work experience and education listed in the profile, the employee is determined to be qualified to perform each of the recommended tasks.

If the employee is qualified (block 62), the employee is added to a list of recipients for that task, but if not, the employee is not added to the recipient list.

After consideration of the employee, one or more predetermined groups of employees can be considered and selected (block 64). Each group can be selected based on attributes, such as work experience and skills, associated with that group. For example, groups can be formed for employees sharing common training, skills, or experience, as well as many other attributes.

Subsequently, the common attributes shared by the members of each group are compared with the recommendation to determine whether the members of one or more groups would be qualified to perform the task associated with the recommendation. If qualified (block 64), the employees in the group are added (block 65) to the list as recipients. However, if none of the groups are qualified, no further users are added to the list. Once the recipients have been determined for one of the selected recommendations, the next recommendation is analyzed (block 66). Once all of the selected task recommendations have been considered, the recommendations are grouped (block 67) for sending to the intended recipients. The recommendations can be sent via text message, email, voice message, Instant Message, or a social networking messaging service. Other methods for transmitting recommendations are possible.

If no qualified employees can be identified for one or more task recommendations, step-by-step instructions can be provided to the employee, or just-in-time training and learning can be enabled to ensure that the employee properly and safely performs the recommended task with guidance. In addition to or alternatively, an unqualified determination can be used to initiate training of the employee, including providing a notification to enroll the employee in a training program, provide the employee with printed training material, or schedule a meeting between a qualified employee and the unqualified employee.

Returning to the above identified example, the researcher is monitored during the different steps of the protein purification process. While preparing the buffer, the researcher spills some of the mercaptoethanol, which is considered toxic. Mercaptoethanol can cause irritation of the nasal passages and respiratory track if inhaled, as well as skin irritation, vomiting, and potentially death for cases of extreme exposure. Once identified as a currently occurring activity, one or more recommendations are identified, including evacuating the laboratory room, warning other employees in the laboratory room, such as via an alarm, turning on fans, air conditioning units, or forced-air heating units, and cleaning up the spill.

Upon review of each of the recommendations, the researcher is determined to be qualified to perform all of the recommended tasks, except for the toxic spill clean-up. However, a group of other employees that are qualified to perform mercaptoethanol clean-ups is identified and the clean-up recommendation is provided to each of the employees in that group, while the other recommendations are provided to the employee. In one embodiment, at least one of the members of the group can select the clean-up recommendation to notify other members in the group that he will perform the clean-up. In a further embodiment, the members of the group can access a chat system associated with the task recommendation system to communicate with one another to determine who can and will perform the clean-up. Further, the member performing the clean-up can be monitored to ensure that the clean-up occurs according to standard procedure.

Additionally, a chat system can be used to provide messages to the employees and groups of employees, as well as allow the employees to communicate with one another. Further, a watcher or artificial agent can monitor the communications and inject contextually relevant information into the channel for the employees. The tasks can also be provided via the chat system and employee selections of the tasks can be displayed.

In a further embodiment, a predicted outcome of an activity performed by a user can also be determined, as described in detail in commonly-owned U.S. patent application Ser. No. 15/203,740, entitled "Computer-Implemented System and Method for Predicting Activity Outcome Based on User Attention,", filed on Jul. 6, 2016, pending, the disclosure of which is incorporated by reference, prior to identifying and requesting qualified individuals to assist the user. For example, upon identifying an activity performed by a user, a connection between the user and a remote expert is made such that the remote expert can provide assistance to the user. During this connection, actions of the service provider are monitored to determine the user's subject of focus. Based on the determined focus subject, an outcome for completion of the service is determined and further assistance, including identifying and assigning at least one qualified individual to assist the user.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented system for providing contextually relevant task recommendations to qualified users, comprising:
   one or more Bluetooth beacons;
   one or more sensors to collect contextual data for a user during performance of a task;
   two or more mobile computing devices associated with the user and at least one of the computing devices comprising Bluetooth, wherein each computing device comprises one of a smartphone, smart watch, and head-mounted computing device and at least one of the mobile computing devices is configured to:
   access the contextual data for the user from the sensors;
   access a location of the user with respect to one of the Bluetooth beacons;
   determine by at least two of the computing devices one or more low-level activities performed by the user based on the contextual data and the location, each low-level activity comprising movement or no movement of the user; and
   transmit from each of the at least two computing devices via an Internetwork data representing the low-level activities determined; and
   a server comprising a central processing unit, an input port to receive the data representing the low-level activities, and an output port, wherein the central processing unit is configured to:
   determine one or more steps of the task being performed by the user;
   anticipate a technological step to complete the task performed by the user in real-time based on the steps being performed by the user, comprising:
      receive the data representing the low-level activities from each of the two or more computing devices;
      determine a high-level activity performed by the user as the task based on the data representing at least a portion of the low level activities comprising movement or no movement performed by the user from each of the two or more computing devices;
      identify two or more steps to be performed by the user during the high-level activity to complete the task based on the steps being performed by the user;
      score the steps based on the high-level activity; and
      select one or more of the steps with the highest scores; and
      provide the selected tasks to the user or other users and cause the task to be completed by the user or at least one of the other users.

2. A system according to claim 1, wherein the central processing unit is further configured to:
   compare the data representing the low-level activities with activity models, wherein each activity model is associated with an activity; and
   select the activity associated with the activity model with the highest similarity to the data representing the low-level activities as the high-level activity.

3. A system according to claim 1, wherein the central processing unit is further configured to:
   determine whether the user is qualified to perform at least one of the selected steps based on a user profile associated with the user; and
   provide the at least one selected step to the user when the user is qualified to perform that selected step.

4. A system according to claim 1, wherein the central processing unit is further configured to:
   maintain groups of users;
   identify at least one group of users qualified to perform at least one of the selected steps; and
   provide the at least one selected step to the users in the identified group.

5. A system according to claim 1, wherein the central processing unit is further configured to:
   receive a request for the user to communicate with another individual; and
   monitor the communication between the user and the other individual.

6. A system according to claim 1, wherein the central processing unit is further configured to:
   determine that one of the steps is being performed by the user.

7. A system according to claim 1, wherein the central processing unit is further configured to:
   receive from the user a selection of one of the selected steps for performance.

8. A system according to claim 7, wherein the central processing unit is further configured to:
   determine that the user is unable to complete the selected step for performance; and
   provide instructional materials to the user based on the determination.

9. A system according to claim 1, wherein the central processing unit is further configured to:
   generate simulations by receiving a contextual scenario and receiving the steps to provide to the user when the contextual scenario occurs.

10. A system according to claim 9, wherein the central processing unit is further configured to:
    compare the sensor data and location with the simulations;
    identify one of the simulations closest related to the sensor data and location; and
    identify steps associated with the closest simulation as candidate steps.

11. A computer-implemented method for providing contextually relevant task recommendations to qualified users, comprising:
    collecting contextual data for a user via one or more sensors during performance of a task by the user;
    accessing the contextual data from the sensors via two or more mobile computing devices associated with the user and at least one of the computing devices comprising Bluetooth, wherein each computing device comprises one of a smartphone, smart watch, and head-mounted computing device;
    accessing a location of the user with respect to one or more Bluetooth beacons;
    determining by at least two of the computing devices one or more low-level activities performed by the user based on the contextual data and the location, wherein each low-level activity comprises movement or no movement of the user;

transmitting data representing the low-level activities determined from each of at least two of the computing devices via an Internetwork;

determining one or more steps of the task being performed by the user;

anticipating a technological step to complete the task performed by the user in real-time based on the steps being performed by the user, comprising:

determining from the data representing at least a portion of the low-level activities each comprising movement or no movement of the user and received from each of the two or more computing devices, a high-level activity performed by the user via a server comprising a central processing unit, an input port to receive the sensor data, and an output port;

identifying two or more steps to be performed by the user during the high-level activity to complete the task based on the steps being performed by the user;

scoring the steps based on the high-level activity via the server; and selecting via the server one or more of the steps with the highest scores; and providing the selected steps to the user or other users and causing the task to be completed by the user or at least one of the other users.

12. A method according to claim 11, wherein the activity is determined, comprising:

comparing the data representing the low-level activities with activity models, wherein each activity model is associated with an activity; and selecting the activity associated with the activity model with the highest similarity to the data representing the low-level activities as the high-level activity.

13. A method according to claim 11, further comprising:

determining whether the user is qualified to perform at least one of the selected steps based on a user profile associated with the user; and providing the at least one selected step to the user when the user is qualified to perform that selected step.

14. A method according to claim 11, further comprising:

maintaining groups of users;

identifying at least one group of users qualified to perform at least one of the selected steps; and providing the at least one selected step to the users in the identified group.

15. A method according to claim 11, further comprising:

receiving a request for the user to communicate with another individual; and monitoring the communication between the user and the other individual.

16. A method according to claim 11, further comprising:

determining that one of the steps is being performed by the user.

17. A method according to claim 11, further comprising:

receiving from the user a selection of one of the selected steps for performance.

18. A method according to claim 17, further comprising:

determining that the user is unable to complete the selected step item for performance; and providing instructional materials to the user based on the determination.

19. A method according to claim 11, further comprising:

generating simulations, comprising:

receiving a contextual scenario; and receiving the steps to provide to the user when the contextual scenario occurs.

20. A method according to claim 19, further comprising:

comparing the sensor data and location with the simulations;

identifying one of the simulations closest related to the sensor data and location; and identifying steps associated with the closest simulation as candidate steps.

* * * * *